United States Patent
Hashimoto et al.

(10) Patent No.: US 9,186,989 B2
(45) Date of Patent: Nov. 17, 2015

(54) CONTROL APPARATUS AND VEHICLE HAVING THE SAME

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Toshiya Hashimoto, Toyota (JP); Hiroyuki Takayanagi, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/478,394

(22) Filed: Sep. 5, 2014

(65) Prior Publication Data

US 2015/0073641 A1 Mar. 12, 2015

(30) Foreign Application Priority Data

Sep. 6, 2013 (JP) ................................ 2013-184775

(51) Int. Cl.
| | |
|---|---|
| *G06F 17/00* | (2006.01) |
| *B60K 23/08* | (2006.01) |
| *B60W 10/26* | (2006.01) |
| *B60K 6/445* | (2007.10) |
| *B60K 6/52* | (2007.10) |
| *B60W 20/00* | (2006.01) |

(52) U.S. Cl.
CPC ............. *B60K 23/0808* (2013.01); *B60K 6/445* (2013.01); *B60K 6/52* (2013.01); *B60W 10/26* (2013.01); *B60W 20/00* (2013.01); *B60K 2023/0858* (2013.01); *B60W 2510/083* (2013.01); *Y10S 903/903* (2013.01)

(58) Field of Classification Search
CPC ... B60W 10/08; B60K 6/445; Y02T 10/6239; F16H 3/006; G06F 19/00
USPC ............... 701/22; 180/65.21, 65.225, 65.265, 180/65.28
See application file for complete search history.

(56) References Cited

U.S. PATENT DOCUMENTS

| | | | |
|---|---|---|---|
| 7,777,433 B2* | 8/2010 | Yamaguchi et al. | 318/139 |
| 8,040,084 B2* | 10/2011 | Muta | 318/376 |
| 8,047,314 B2* | 11/2011 | Oba et al. | 180/65.265 |
| 8,100,207 B2* | 1/2012 | Oba et al. | 180/65.285 |
| 8,122,983 B2* | 2/2012 | Katsuta et al. | 180/65.225 |
| 8,251,165 B2* | 8/2012 | Katsuta et al. | 180/65.265 |
| 8,682,546 B2* | 3/2014 | Otsuka et al. | 701/54 |
| 9,038,759 B2* | 5/2015 | Kaneko et al. | 180/235 |
| 2009/0051304 A1* | 2/2009 | Muta | 318/376 |

FOREIGN PATENT DOCUMENTS

JP 2003-32802 1/2003

* cited by examiner

*Primary Examiner* — McDieunel Marc
(74) *Attorney, Agent, or Firm* — Nixon & Vanderhye PC

(57) ABSTRACT

In a control apparatus for controlling front-wheel and rear-wheel rotating electrical machines capable of driving front and rear wheels of a vehicle on electrical power of a battery, a command torque determinator determines command torques for the rotating electrical machines based on a predetermined torque distribution ratio, a power distribution ratio calculator calculates a power distribution ratio based on the torque distribution ratio, an outputtable torque calculator calculates outputtable torques of the rotating electrical machines, a power distribution ratio corrector corrects the power distribution ratio based on the outputtable torques, and a power distributor distributes the electrical power of the battery between the rotating electrical machines in the corrected power distribution ratio.

7 Claims, 4 Drawing Sheets

CONTROL APPARATUS AND VEHICLE HAVING THE SAME

CROSS REFERENCE TO RELATED APPLICATION

This application is based on Japanese Patent Application No. 2013-184775 filed on Sep. 6, 2013, the contents of which are incorporated herein by reference.

FIELD

The present disclosure relates to a control apparatus and a vehicle having the control apparatus.

BACKGROUND

A technique has been proposed to drive and rotate front and rear wheels of a vehicle separately by two rotating electrical machines. For example, JP-A-2003-32802 discloses a four-wheel-drive hybrid vehicle in which a motor MG3 drives and rotates front wheels and a motor MG2 drives and rotates rear wheels. The motors MG2, MG3 are controlled by a control apparatus mounted on the vehicle.

In the control apparatus disclosed in JP-A-2003-32802, a request torque is divided between the motor MG2 and the motor MG3. At this time, a torque division ratio is set so that the amount of torque distributed to the motor MG3 can be greater than the amount of torque distributed to the motor MG2. Further, a power distribution ratio in which electrical power of a battery is distributed between the motors is set equal to the torque division ratio because the rotation speeds of the front and rear wheels are equal to each other.

In a vehicle having the control apparatus disclosed in JP-A-2003-32802, torque of the motor MG3 may be limited due to heat, and the supply of electrical power to the motor MG2 may be limited depending on the remaining power of the battery. In this case, the motor MG2 and the motor MG3 may be unable to output torques according to command torques. Specifically, although the motor MG3 can be supplied with electrical power enough to output the command torque, the motor MG3 may be unable to output the command torque due to heat. That is, the motor MG3 is supplied with the amount of electrical power the motor MG3 is expected to be unable to consume. In contrast, since the motor MG2 may lack electrical power due to short of the remaining power of the battery, the motor MG2 may be unable to output the command torque.

SUMMARY

In view of the above, it is an object of the present disclosure to provide a control apparatus and a vehicle having the control apparatus capable of increasing the total amount of output torques of front-wheel and rear-wheel rotating electrical machines even when torque and electrical power supply are limited under a predetermined condition.

According to an aspect of the present disclosure, a control apparatus is configured to control a front-wheel rotating electrical machine and a rear-wheel rotating electrical machine. The front-wheel rotating electrical machine is capable of driving a front wheel of a vehicle on electrical power of a battery. The rear-wheel rotating electrical machine is capable of driving a rear wheel of the vehicle on the electrical power of the battery. The control apparatus includes a command torque determinator, a power distribution ratio calculator, an outputtable torque calculator, a power distribution ratio corrector, and a power distributor.

The command torque determinator determines a command torque for the front-wheel rotating electrical machine and a command torque for the rear-wheel rotating electrical machine based on a predetermined torque distribution ratio.

The power distribution ratio calculator calculates a power distribution ratio based on the torque distribution ratio. The power distribution ratio is a ratio in which the electrical power of the battery is distributed between the front-wheel rotating electrical machine and the rear-wheel rotating electrical machine.

The outputtable torque calculator calculates an outputtable torque of the front-wheel rotating electrical machine and an outputtable torque of the rear-wheel rotating electrical machine.

The power distribution ratio corrector corrects the power distribution ratio based on the outputtable torques calculated by the outputtable torque calculator.

The power distributor distributes the electrical power of the battery between the front-wheel rotating electrical machine and the rear-wheel rotating electrical machine in the power distribution ratio corrected by the power distribution ratio corrector.

As described above, according to the aspect, the power distribution ratio is corrected based on the outputtable torques calculated by the outputtable torque calculator, and the electrical power of the battery is distributed between the front-wheel rotating electrical machine and the rear-wheel rotating electrical machine in the corrected power distribution ratio. Thus, for example, it is possible to prevent the amount of electrical power the front-wheel rotating electrical machine is expected to be unable to consume from being unnecessarily distributed to the front-wheel rotating electrical machine. Accordingly, the amount of electrical power distributed to the rear-wheel rotating electrical machine increases, and torque actually outputted from the rear-wheel rotating electrical machine increases. As a result, the sum of driving forces outputted from the front and rear wheels, i.e., the total driving force of the vehicle increases.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A control apparatus and a vehicle according to an embodiment of the present disclosure are described below with reference to the drawings.

Figure 1:
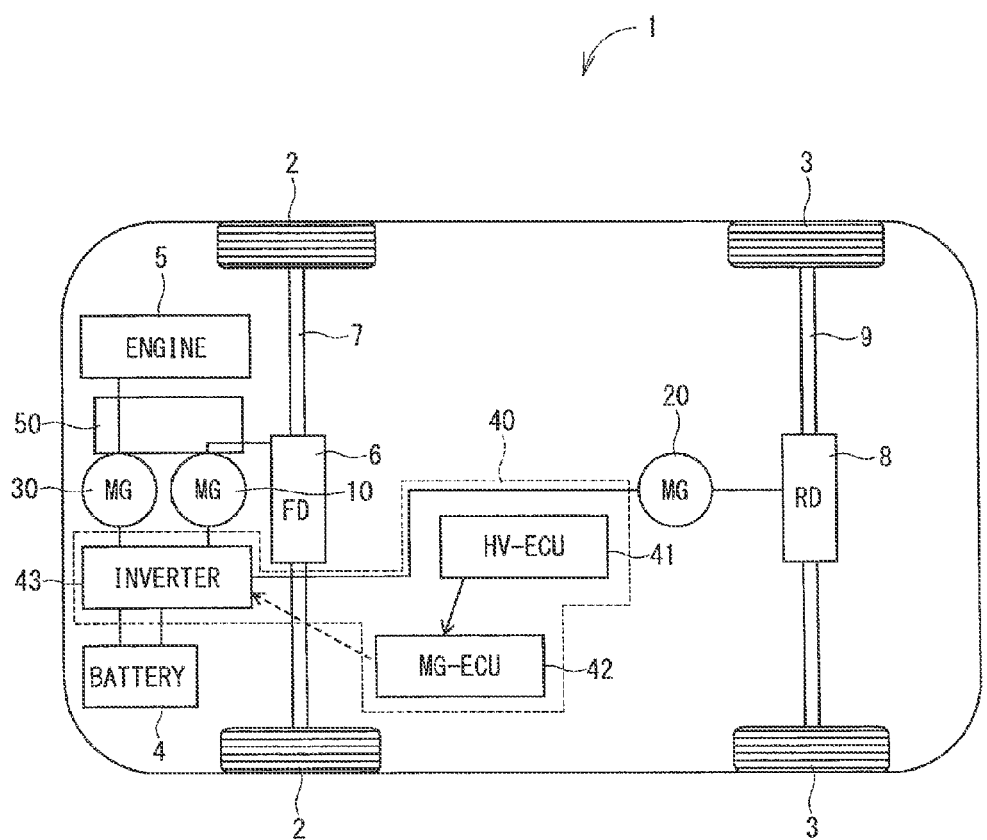
FIG. 1 is a diagram illustrating a vehicle having a control apparatus according to an embodiment of the present disclosure.

As shown in FIG. 1, a vehicle 1 includes front wheels 2, rear wheels 3, a battery 4, an internal-combustion engine 5, rotating electrical machines 10, 20, and 30, a control apparatus 40, and a mechanical power combiner/splitter 50.

For example the vehicle 1 can be a hybrid vehicle and run on torques outputted by multiple separate power sources: the engine 5 and the rotating electrical machines 10, 20, and 30.

For example, the engine 5 can be a gasoline engine and driven (rotated) on gasoline as a fuel to output torque from a crank shaft (not shown). The rotating electrical machines 10, 20, and 30 are electric motors and rotate on electrical power of the battery 4 mounted on the vehicle 1 to output torques. Further, the rotating electrical machines 10, 20, and 30 are capable of serving as electric generators to generate electrical powers to charge the battery 4.

Figure 2:
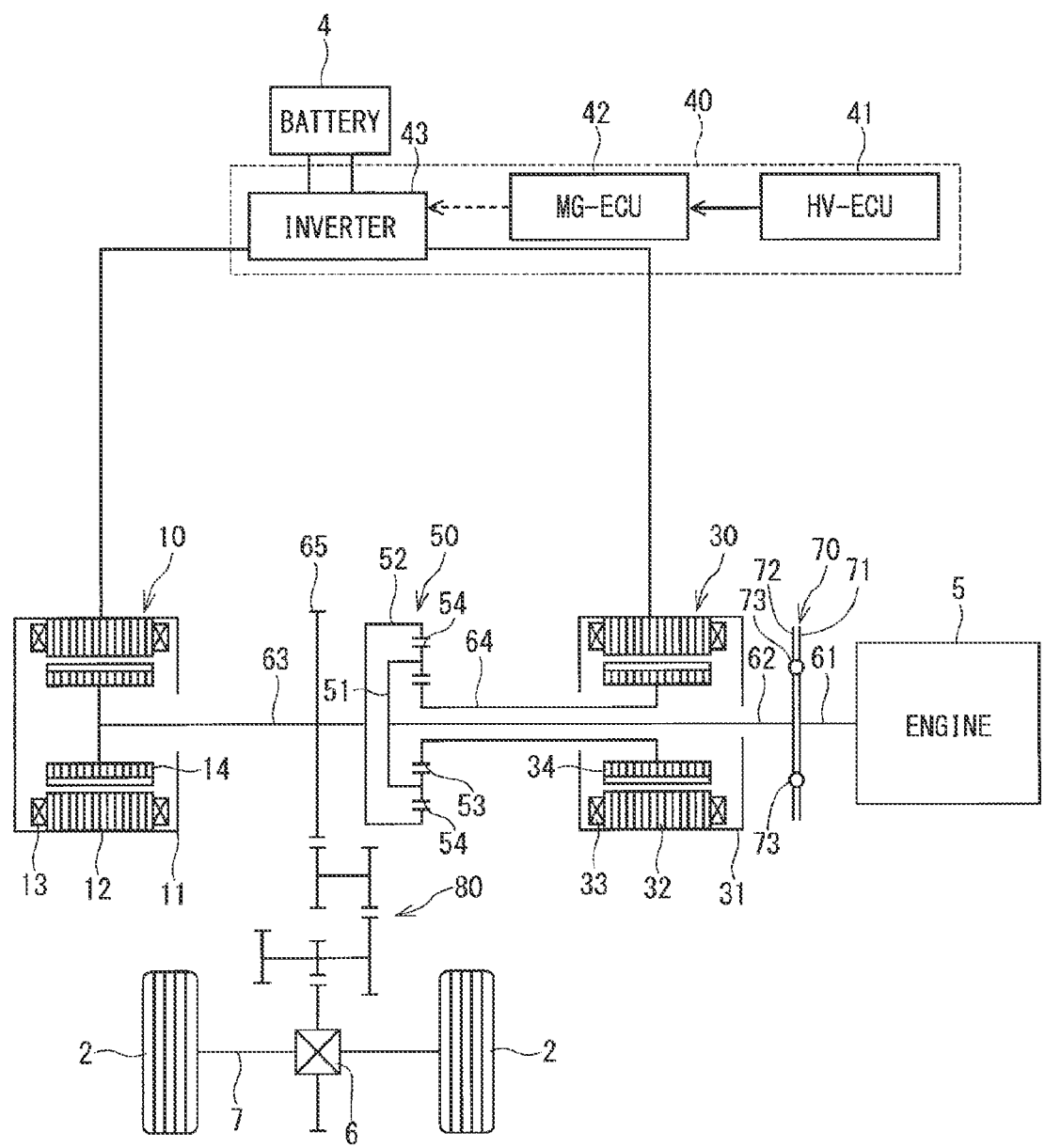
FIG. 2 is a diagram illustrating a structure near a front wheel of the vehicle.

As shown in FIG. 2, the rotating electrical machine 10 includes a housing 11, a stator 12, a coil 13, and a rotor 14. For example, the stator 12 is made of metal such as iron, shaped like a tube, and fixed to an inner wall of the housing 11. The coil 13 is wound on the stator 12. For example, the rotor 14 is made of metal such as iron, shaped like a tube, and rotatably supported inside the stator 12. A magnet is attached on an outer wall of the rotor 14. The coil 13 is supplied with electrical power from the battery 4 via an inverter 43 which is described later. Thus, a rotating magnetic field is produced in the stator 12, so that the rotor 14 rotates. Further, when the rotor 14 rotates, an electric current flows through the coil 13 and charges the battery 4 via the inverter 43.

The rotating electrical machine 30 includes a housing 31, a stator 32, a coil 33, and a rotor 34. For example, the stator 32 is made of metal such as iron, shaped like a tube, and fixed to an inner wall of the housing 31. The coil 33 is wound on the stator 32. For example, the rotor 34 is made of metal such as iron, shaped like a tube, and rotatably supported inside the stator 32. A magnet is attached on an outer wall of the rotor 34. The coil 33 is supplied with electrical power from the battery 4 via the inverter 43. Thus, a rotating magnetic field is produced in the stator 32, so that the rotor 34 rotates. Further, when the rotor 34 rotates, an electric current flows through the coil 33 and charges the battery 4 via the inverter 43.

As shown in FIG. 2, the vehicle 1 further includes a first axle 61, a damper 70, a second axle 62, a third axle 63, a fourth axle 64, and a gear mechanism 80. For example, the first axle 61 is made of metal and shaped like a rod. A first end of the first axle 61 is connected to the crank shaft of the engine 5. It is noted that the first axle 61 is integrally and coaxially connected to the crank shaft. Thus, torque of the engine 5 is inputted to the first axle 61.

The damper 70 includes plate portions 71 and 72 and a spring 73.

For example, the plate portion 71 is made of metal and shaped like a circular plate. For example, like the plate portion 71, the plate portion 72 is made of metal and shaped like a circular plate. For example, the spring 73 is made of metal, shaped like a coil or spiral, and capable of being elastically deformed.

The plate portions 71 and 72 are spaced from each other by a predetermined distance and coaxially aligned with each other. It is noted that the plate portion 71 and the plate portion 72 can rotate relative to each other. A second end of the first axle 61 is connected to the center of the plate portion 71.

For example, like the first axle 61, the second axle 62 is made of metal and shaped like a rod. A first end of the second axle 62 is connected to the center of the plate portion 72.

Multiple springs 73 are provided between the plate portions 71 and 72. Thus, for example, when only one of the first axle 61 and the second axle 62 rotates suddenly in a short period of time, the springs 73 are compressed by the plate portions 71 and 72 and elastically deformed. Accordingly, the restoring forces of the springs 73 act on the first axle 61 and the second axle 62 via the plate portions 71 and 72. Therefore, even when only one of the first axle 61 and the second axle 62 rotates suddenly, it is possible to prevent the sudden rotation from being transmitted as impact to the other of the first axle 61 and the second axle 62. In this way, the damper 70 serves as a damping mechanism to reduce impact between the first axle 61 and the second axle 62 by means of elasticity of the springs 73. Further, each of the plate portions 71 and 72 has a predetermined mass and serves as a so-called flywheel. Thus, for example, even when a sudden rotation or a torque ripple occurs in the crank shaft at startup of the engine 5, it is possible to prevent impact due to the sudden rotation or the torque ripple from being transmitted to the second axle 62.

For example, the third axle 63 is made of metal and shaped like a rod. A first end of the third axle 63 is connected to the combiner/splitter 50, which is described later, and a second end of the third axle 63 is connected to the rotor 14 of the rotating electrical machine 10. Thus, torque of the rotating electrical machine 10 is inputted to the second end of the third axle 63.

A gear 65 is integrated with the third axle 63 and located in the middle of the third axle 63 in an axial direction of the third axle 63. The gear 65 is capable of meshing with a gear of the gear mechanism 80. The gear of the gear mechanism 80 is capable of meshing with a front differential gear 6. A vehicle axle 7 is connected to the front differential gear 6. One of the front wheels 2 is connected to a first end of the vehicle axle 7, and the other of the front wheels 2 is connected to a second end of the vehicle axle 7. Thus, the front wheels 2 rotate according to the rotation of the third axle 63.

For example, the fourth axle 64 is made of metal and shaped like a tube so that the second axle 62 can be inserted inside the fourth axle 64. It is noted that the second axle 62 and the fourth axle 64 can rotate relative to each other. A first end of the fourth axle 64 is connected to the rotor 34 of the rotating electrical machine 30. Thus, torque of the rotating electrical machine 30 is inputted to the first end of the fourth axle 64.

The combiner/splitter 50 includes a carrier 51, a ring gear 52, a sun gear 53, and a pinion gear 54.

The carrier 51 is connected to a second end of the second axle 62 and capable of rotating with the second axle 62. The ring gear 52 is connected to the first end of the third axle 63 and capable of rotating with the third axle 63. The ring gear 52 has inner teeth on its inner edge. The sun gear 53 is connected to a second end of the fourth axle 64 and can rotate with the fourth axle 64. The sun gear 53 has outer teeth on its outer edge.

Multiple pinion gears 54 are provided on an outer edge of the carrier 51 and capable of rotating on its axis. Each pinion gear 54 has outer teeth on its outer edge. The outer teeth of the pinion gear 54 are capable of meshing with the inner teeth of the ring gear 52 and the outer teeth of the sun gear 53. Accordingly, for example, when the carrier 51 rotates with the second axle 62, the pinion gear 54 rotates around the sun gear 53 while rotating on its axis. At this time, the ring gear 52 (the third axle 63) rotates relative to the fourth axle 64.

In this way, the mechanical power combiner/splitter 50 is provided among the second end of the second axle 62, the first end of the third axle 63, and the second end of the fourth axle 64 so that torque can be transmitted among the second axle 62, the third axle 63, and the fourth axle 64 from one another.

In the above structure, when the rotating electrical machine 30 serves as a generator, the combiner/splitter 50 distributes the torque of the engine 5 inputted from the carrier 51 (the second axle 62) between the sun gear 53 (the fourth axle 64, the rotating electrical machine 30) side and the ring gear 52 (the third axle 63) side according to their gear ratio, for example. In contrast, when the rotating electrical machine 30 serves as a motor, the combiner/splitter 50 combines the torque of the engine 5 inputted from the carrier 51 (the second axle 62) and the torque of the rotating electrical machine 30 inputted from the sun gear 53 (the fourth axle 64) and outputs the combined torque to the ring gear 52 (the third axle 63) side. The torque outputted to the ring gear 52 is outputted to the front wheels 2 via the third axle 63, the gear 65, the gear mechanism 80, the front differential gear 6, and the vehicle axle 7.

Further, when the rotating electrical machine 10 serves as a motor, the combiner/splitter 50 combines the torque of the engine 5 inputted from the carrier 51 (the second axle 62) and the torque of the rotating electrical machine 10 inputted from the ring gear 52 (the third axle 63) and outputs the combined torque to the third axle 63 side. The torque outputted to the third axle 63 is outputted to the front wheels 2 via the gear 65, the gear mechanism 80, the front differential gear 6, and the vehicle axle 7. In contrast, when the rotating electrical machine 10 serves as a generator, the combiner/splitter 50 distributes the torque of the front wheels 2 inputted from the ring gear 52 (the third axle 63) among the third axle 63 (the rotating electrical machine 10) side, the carrier 51 (the second axle 62) side, and the sun gear 53 (the fourth axle 64) side.

In this way, when the rotating electrical machine 10 serves as a motor, the rotating electrical machine 10 can drive and rotate the front wheels 2 via the third axle 63, the gear 65, the gear mechanism 80, the front differential gear 6, and the vehicle axle 7. The rotating electrical machine 10 corresponds to a front-wheel rotating electrical machine recited in claims. Further, when the rotating electrical machine 30 serves as a generator, the rotating electrical machine 30 generates electrical power by inputted torque. The rotating electrical machine 30 corresponds to a power-generation rotating electrical machine recited in claims. Although the rotating electrical machine 30 is used to generate electrical power, the rotating electrical machine 30 can be driven on the electrical power of the battery 4 to serve as a motor. That is, the rotating electrical machine 30 can be used for other purposes than generating electrical power.

The rotating electrical machine 20 is structured in the same manner as the rotating electrical machines 10, 30. An output shaft of the rotating electrical machine 20 is connected to the rear differential gear 8. When the rotating electrical machine 20 is supplied with the electrical power from the battery 4 via the inverter 43, the rotating electrical machine 20 serves a motor and rotates. Torque outputted from the output shaft of the rotating electrical machine 20 is transmitted to the rear wheels 3 via the rear differential gear 8 and a vehicle axle 9. Accordingly, the rear wheels 3a are driven and rotated.

Further, when torque of the rear wheels 3 is inputted to the rotating electrical machine 20 via the rear differential gear 8 and the vehicle axle 9, the rotating electrical machine 20 can serve as a generator to generate electrical power. The electrical power generated by the rotating electrical machine 20 charges the battery 4 via the inverter 43.

In this way, when the rotating electrical machine 20 serves as a motor, the rotating electrical machine 20 can drive and rotate the rear wheels 3 via the rear differential gear 8 and the vehicle axle 9. The rotating electrical machine 20 corresponds to a rear-wheel rotating electrical machine recited in claims.

As shown in FIG. 1, the control apparatus 40 includes a HV-ECU 41, a MG-ECU 42, and the inverter 43.

For example, each of the HV-ECU 41 and the MG-ECU 42 is configured as a microcomputer and includes a central processing unit (CPU), a read only memory (ROM), a random access memory (RAM), and an input/output section.

The HV-ECU 41 performs overall control of the vehicle 1 by executing calculations in accordance with programs stored in the ROM based on signals received from sensors (not shown) mounted on the vehicle 1 to control devices and apparatuses of the vehicle 1.

The MG-ECU 42 drives and controls the rotating electrical machines 10, 20, and 30 via the inverter 43 by executing calculations in accordance with programs stored in the ROM based on signals from the HV-ECU 41.

The inverter 43 includes switching elements such as insulated-gate bipolar transistors (IGBTs). The inverter 43 operates based on signals from the MG-ECU 42, converts direct-current (DC) power of the battery 4 to alternating-current (AC) power, and supplies the AC power to the rotating electrical machines 10, 20, and 30. Thus, the rotating electrical machines 10, 20, and 30 can be driven.

The HV-ECU 41 controls the operation of the engine 5 and the torques of the rotating electrical machines 10, 20, and 30 based on the signals from the sensors and changes the torque distribution ratio at which the combiner/splitter 50 distributes torque and a torque combination ratio at which the combiner/splitter 50 combines torques. Thus, the HV-ECU 41 allows the vehicle 1 to run in various manners.

For example, the signals received by the HV-ECU 41 include a vehicle speed signal, an acceleration signal, a brake signal, a shift signal, a behavior signal, and a SOC signal. The vehicle speed signal indicates a running speed of the vehicle 1. The acceleration signal indicates a degree of opening of an accelerator. The brake signal indicates a degree of depression of a brake pedal. The shift signal indicates a position of a shift selector. The behavior signal indicates a behavior of the vehicle 1. The SOC signal indicates a remaining power of the battery 4, i.e., a state of charge (SOC) of the battery 4.

For example, the vehicle speed signal is outputted from a vehicle speed sensor mounted near the front wheel 2 or the rear wheel 3. The acceleration signal is outputted from an accelerator opening degree sensor. The brake signal is outputted from a brake depression degree sensor. The shift signal is outputted from a shift position sensor. The behavior signal is outputted from an acceleration sensor mounted on the vehicle 1. The SOC signal is outputted from a battery monitoring device which detects the remaining power of the battery 4.

According to the embodiment, each of the rotating electrical machines 10, 20, and 30 is provided with a resolver (not shown). Each resolver detects a rotational position of a corresponding one of the rotating electrical machines 10, 20, and 30 and outputs a rotation signal indicative of the detected rotational position to the HV-ECU 41. The HV-ECU 41 calculates (i.e., detects) rotational speeds of the rotating electrical machines 10, 20, and 30 based on the rotation signals received from the resolvers.

Further, according to the embodiment, each of the rotating electrical machines 10 and 20 is provided with a temperature sensor (not shown). Each temperature sensor detects a temperature of a corresponding one of the rotating electrical machines 10 and 20 and outputs a temperature signal indicative of the detected temperature to the HV-ECU 41. The HV-ECU 41 calculates (i.e., detects) temperatures of the rotating electrical machines 10 and 20 based on the temperature signals received from the temperature sensors.

Figure 3:
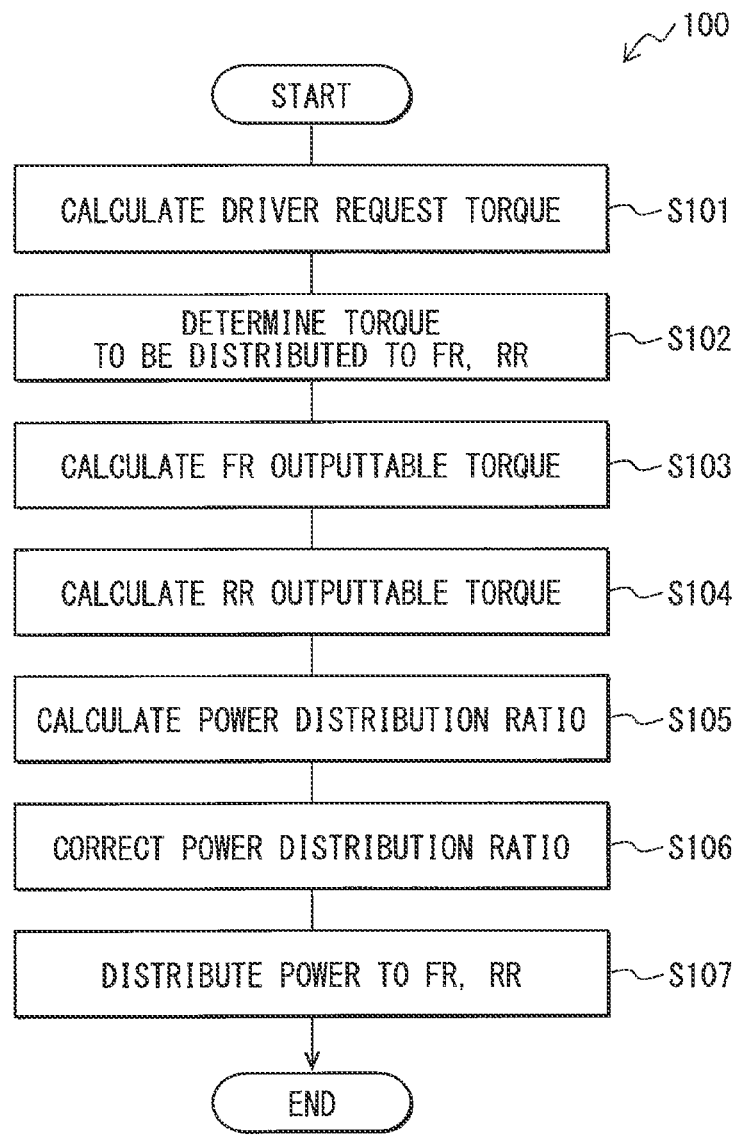
FIG. 3 is a diagram illustrating a flow of a control process performed by the control apparatus.

Next, a control process 100 performed by the control apparatus 40 to control the rotating electrical machines 10 and 20 is described below with reference to FIG. 3. For example, the control process 100 starts to perform the control process 100 when an ignition switch of the vehicle 1 is turned ON.

The control process 100 starts at S101 where the HV-ECU 41 calculates driver request torque to be outputted from the vehicle axles 7 and 9 to the front and rear wheels 2 and 3 based on the acceleration signal, the brake signal, the vehicle signal, the shift signal, and the behavior signal.

Then, the control process 100 proceeds to S102 where the HV-ECU 41 determines torque (i.e., command torque) to be distributed to the front wheels 2 (the vehicle axle 7, the rotating electrical machine 10) side and the rear wheels 3 (the vehicle axle 9, the rotating electrical machine 20) side by dividing the driver request torque calculated at S101 in a predetermined torque distribution ratio. It is noted that the torque distribution ratio is set so that the amount of torque to be distributed to the front wheels 2 (the vehicle axle 7, the rotating electrical machine 10) side can be equal to or greater than the amount of torque to be distributed to the rear wheels 3 (the vehicle axle 9, the rotating electrical machine 20) side. The HV-ECU 41 serves as a command torque determinator recited in claims when performing S102.

Then, the control process 100 proceeds to S103 where the HV-ECU 41 calculates outputtable torque the rotating electrical machine 10 can output. The calculation of the outputtable torque of the rotating electrical machine 10 is performed to limit torque outputted from the rotating electrical machine 10.

The outputtable torque of the rotating electrical machine 10 varies depending on the remaining power of the battery 4, the temperature of the rotating electrical machine 10, demagnetization of the rotating electrical machine 10, or "cancel torque capable of canceling reaction force exerted on the front wheels 2". For this reason, according to the embodiment, the HV-ECU 41 calculates the outputtable torque of the rotating electrical machine 10 based on the remaining power of the battery 4, the temperature, of the rotating electrical machine 10, the demagnetization of the rotating electrical machine 10, or the "cancel torque capable of canceling the reaction force exerted on the front wheels 2". The HV-ECU 41 serves as an outputtable torque calculator recited in claims when performing S103.

Figure 4:
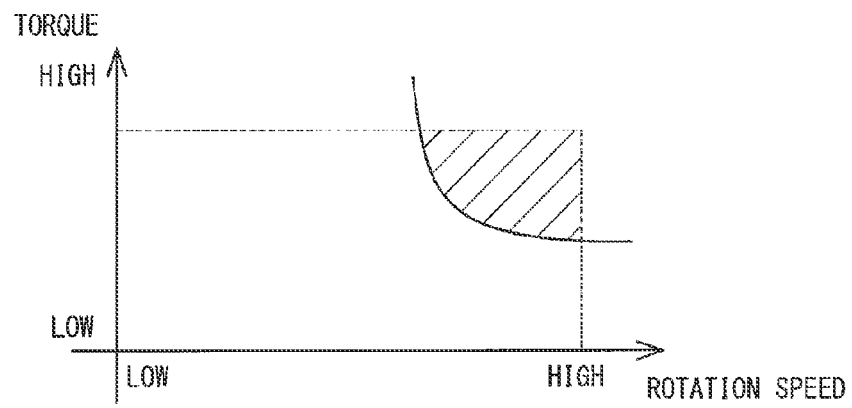
FIG. 4 is a diagram illustrating a characteristic of a rotating electrical machine of the vehicle.

The "demagnetization" is a phenomenon where the magnetic force of the magnet of the rotor 14 decreases under high temperature environments or counter magnetic fields. The demagnetization results in a reduction in the output torque of the rotating electrical machine 10. If the demagnetization occurs once in the magnet of the rotating electrical machine 10, there is a possibility that the magnet force does not return to its original force even after the environment returns to normal. Further, if a relationship between the rotation speed and torque of the rotating electrical machine 10 falls within a predetermined range (i.e., hatched area in FIG. 4), the magnetic force of the magnet may be decrease even when the temperature of the rotating electrical machine 10 falls within a predetermined temperature range. For this reason, according to the embodiment, the torque outputted from the rotating electrical machine 10 is limited by calculating the outputtable torque of the rotating electrical machine 10 based on the temperature, the rotation speed, and the torque (i.e., demagnetization) of the rotating electrical machine 10 (i.e., a front-wheel rotating electrical machine).

The "cancel torque capable of canceling the reaction force exerted on the front wheels 2" is torque to be outputted by the rotating electrical machine 30 in a direction opposite to a rotation direction of the front wheels 2 rotating with the rotating electrical machine 30 when the rotating electrical machine 30 is driven as a starter to start up the engine 5.

According to the embodiment, the "cancel torque capable of canceling reaction force exerted on the front wheels 2" is ensured so that the vehicle 1 can be ready to move forward.

Figure 5:
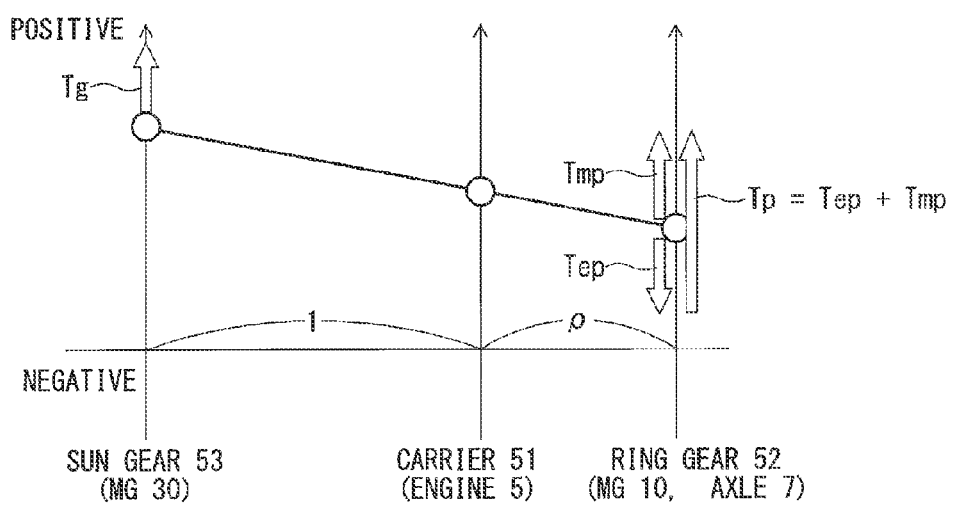
FIG. 5 is a diagram for explaining operations of a mechanical power combiner/splitter of the vehicle.

Specifically, as shown in FIG. 5, when the engine 5 is started up, the rotating electrical machine 30 (i.e., a power-generation rotating electrical machine) outputs positive torque to the sun gear 53. At this time, torque transmitted from the sun gear 53 to the ring gear 52 (the rotating electrical machine 10 (i.e., a front-wheel rotating electrical machine), the vehicle axle 7) side via the carrier 51 (i.e., the engine 5) is negative. The ring gear 52 rotates in conjunction with the front wheels 2. Accordingly, the vehicle 1 does not move forward when the rotating electrical machine 30 does not output torque. For this reason, it is necessary for the rotating electrical machine 10 to output torque opposing the negative torque (i.e., the reaction force) transmitted to the ring gear 52, and the torque to be outputted by the rotating electrical machine 10 at this time corresponds to the "cancel torque capable of canceling the reaction force exerted on the front wheels 2". In FIG. 5, "ρ" represents a gear ratio of the pinion gear 54 of the combiner/splitter 50, "Tg" represents torque of the rotating electrical machine 30 (i.e., a power-generation rotating electrical machine), "Tmp" represents torque of the rotating electrical machine 10 (i.e., a front-wheel rotating electrical machine), "Tep" represents torque transmitted from the engine 5 side to the ring gear 52, and "Tp" represents torque of the vehicle 1 (i.e., the front wheels 2).

Then, the control process 100 proceeds to S104 where the HV-ECU 41 calculates outputtable torque the rotating electrical machine 20 can output. The calculation of the outputtable torque of the rotating electrical machine 20 is performed to limit torque outputted from the rotating electrical machine 20.

The outputtable torque of the rotating electrical machine 20 varies depending on the remaining power of the battery 4, the temperature of the rotating electrical machine 20, or demagnetization of the rotating electrical machine 20. For this reason, according to the embodiment, the HV-ECU 41 calculates the outputtable torque of the rotating electrical machine 20 based on the remaining power of the battery 4, the temperature of the rotating electrical machine 20, or the demagnetization of the rotating electrical machine 20. The HV-ECU 41 serves as an outputtable torque calculator recited in claims when performing S104.

Then, the control process 100 proceeds to S105 where the HV-ECU 41 calculates a power distribution ratio based on the torque distribution ratio. The power distribution ratio is a ratio in which the electrical power form the battery 4 is distributed between the rotating electrical machine 10 and the rotating electrical machine 20. The HV-ECU 41 calculates the power distribution ratio so that the amount of electrical power to be distributed to the rotating electrical machine 10 (i.e., a front-wheel rotating electrical machine) can be equal to or greater than the amount of electrical power to be distributed to the rotating electrical machine 20 (i.e., a rear-wheel rotating electrical machine). The HV-ECU 41 serves as a power distribution ratio calculator recited in claims when performing S105.

Then, the control process 100 proceeds to S106 where the HV-ECU 41 corrects the power distribution ratio, which is calculated at S105, based on the outputtable torque of the rotating electrical machine 10, which is calculated at S103, and the outputtable torque of the rotating electrical machine 20, which is calculated at S104. The HV-ECU 41 serves as a power distribution ratio corrector recited in claims when performing S106.

Then, the control process 100 proceeds to S107 where the HV-ECU 41 controls the inverter 43 through the MG-ECU 42 based on the power distribution ratio corrected at S106, thereby distributing the electrical power supplied from the battery 4 between the rotating electrical machine 10 and the rotating electrical machine 20 in the corrected power distribution ratio. Accordingly, the rotating electrical machines 10 and 20 are driven by the electrical powers supplied from the battery 4 so that the front wheels 2 and the rear wheels 3 can rotate. The HV-ECU 41 serves as a power distributor recited in claims when performing S107.

After S107, the control process 100 ends. If the ignition switch remains ON when the control process 100 ends, the control apparatus 40 restarts the control process 100. That is, the control process 100 is repeated until the ignition switch is turned OFF.

Next, an example of how the control apparatus 40 drives and controls the rotating electrical machines 10 and 20 is explained. For example, when the predetermined torque distribution ratio between the front wheel 2 side and the rear wheel 3 side is set at "6:4", the HV-ECU 41 calculates the power distribution ratio to be "6:4" at S105. Then, at S106, the HV-ECU 41 corrects the power distribution ratio to be "5:5" based on the outputtable torque of the rotating electrical machine 10, which is calculated at S103, and the outputtable torque of the rotating electrical machine 20, which is calculated at S104. That the HV-ECU 41 corrects the power distribution ratio by limiting the command torques determined at S102 by the outputtable torque of the rotating electrical machine 10, which is calculated at S103, and the outputtable torque of the rotating electrical machine 20, which is calculated at S104. In such an approach, it is possible to prevent the amount of electrical power the rotating electrical machine 10 (i.e., a front-wheel rotating electrical machine) is expected to be unable to consume from being unnecessarily distributed to the rotating electrical machine 10.

As described above, according to the embodiment, the vehicle 1 has the front wheels 2, the rear wheels 3, the battery 4, the engine 5, the rotating electrical machines 10, 20, and 30, the control apparatus 40, and the mechanical power combiner/splitter 50.

According to the embodiment, the control apparatus 40 can serve as the "command torque determinator" to determine command torques for the rotating electrical machine 10 (i.e., a front-wheel rotating electrical machine) and the rotating electrical machine 20 (i.e., a rear-wheel rotating electrical machine) based on the predetermined torque distribution ratio.

The control apparatus 40 can serve as the "power distribution ratio calculator" to calculate the power distribution ratio, in which the electrical power form the battery 4 is distributed between the rotating electrical machine 10 and the rotating electrical machine 2, based on the torque distribution ratio.

The control apparatus 40 can serve as the "outputtable torque calculator" to calculate the outputtable torques of the rotating electrical machines 10 and 20.

The control apparatus 40 can serve as the "power distribution ratio corrector" to correct the power distribution ratio based on the calculated outputtable torques of the rotating electrical machines 10 and 20.

The control apparatus 40 can serve as the "power distributor" to distribute the electrical power supplied from the battery 4 between the rotating electrical machines 10 and 20 in the corrected power distribution ratio.

As described above, according to the embodiment, the control apparatus 40 corrects the power distribution ratio based on the calculated outputtable torques of the rotating electrical machine 10 (i.e., a front-wheel rotating electrical machine) and the rotating electrical machine 20 (i.e., a rear-wheel rotating electrical machine) and distributes the electrical power of the battery 4 between the rotating electrical machines 10 and 20. Thus, for example, it is possible to prevent the amount of electrical power the rotating electrical machine 10 is expected to be unable to consume from being unnecessarily distributed to the rotating electrical machine 10. Accordingly, the amount of electrical power distributed to the rotating electrical machine 20 increases, and torque actually outputted from the rotating electrical machine 20 increases. As a result, the sum of the driving forces outputted from the front wheels 2 and the rear wheels 3, i.e., the total driving force of the vehicle 1 increases.

Further, according to the embodiment, when the control apparatus 40 serves as the "power distribution ratio corrector", the control apparatus 40 corrects the power distribution ratio by limiting the determined command torques for the rotating electrical machine 10 (i.e., a front-wheel rotating electrical machine) and the rotating electrical machine 20 (i.e., a rear-wheel rotating electrical machine) by the outputtable torques of the rotating electrical machines 10 and 20. In such an approach, as described above, it is possible to prevent the amount of electrical power the rotating electrical machine 10 is expected to be unable to consume from being unnecessarily distributed to the rotating electrical machine 10.

Further, according to the embodiment, when the control apparatus 40 serves as the "power distribution ratio calculator", the control apparatus 40 calculates the power distribution ratio so that the amount of electrical power to be distributed to the rotating electrical machine 10 (i.e., a front-wheel rotating electrical machine) can be equal to or greater than the amount of electrical power to be distributed to the rotating electrical machine 20 (i.e., a rear-wheel rotating electrical machine). This is a specific example of the embodiment.

Further, according to the embodiment, when the control apparatus 40 serves as the "outputtable torque calculator", the control apparatus 40 calculates the outputtable torques of the rotating electrical machine 10 (i.e., a front-wheel rotating electrical machine) and the rotating electrical machine 20 (i.e., a rear-wheel rotating electrical machine) based on the remaining power of the battery 4, the temperatures of the rotating electrical machines 10 and 20, or a combination of the temperatures, the rotation speeds, and the torques of the rotating electrical machines 10 and 20. Thus, the outputtable torques of the rotating electrical machines 10 and 20 can be calculated accurately. Accordingly, the electrical power of the battery 4 can be effectively distributed between the rotating electrical machines 10 and 20.

Further, according to the embodiment, when the control apparatus 40 serves as the "outputtable torque calculator", the control apparatus 40 calculates the outputtable torque of the rotating electrical machine 10 based on the "cancel torque capable of canceling the reaction force exerted on the front wheels 2 when the rotating electrical machine 30 is driven to start up the engine 5". Thus, in the vehicle 1 having the mechanical power combiner/splitter 50, the electrical power of the battery 4 can be effectively distributed between the rotating electrical machines 10 and 20.

(Modifications)

The embodiment can be modified in various ways, for example, as follows.

When the control apparatus serves as the "power distribution ratio calculator", the control apparatus calculates the power distribution ratio so that the amount of electrical power to be distributed to the rotating electrical machine for front wheels can be less than the amount of electrical power to be distributed to the rotating electrical machine for rear wheels.

Further, when the control apparatus 40 serves as the "outputtable torque calculator", the control apparatus 40 can calculate the outputtable torques of the rotating electrical machine for front wheels and the rotating electrical machine for rear wheels based on at least one of the remaining power of the battery 4, the temperatures of the rotating electrical machines, and the combination of the temperatures, the rotation speeds, and the torques of the rotating electrical machines.

The gear structure and gear ratio of the combiner/splitter are not limited to the embodiment and can be set in any way.

The vehicle can have no internal-combustion engine, no power-generation rotating electrical machine), and no mechanical power combiner/splitter. That is, for example, the present disclosure can be applied to a control apparatus for a four-wheel-drive electric vehicle which runs on rotating electrical machines for front and rear wheels alone. In this case, when the control apparatus serves as the "outputtable torque calculator", the control apparatus can effectively distribute electrical power of the battery between the rotating electrical machine for the front wheels and the rotating electrical machine for the rear wheels by calculating the outputtable torques of the rotating electrical machines based on at least one of the remaining power of the battery, the temperatures of the rotating electrical machines, and a combination of the temperatures, rotation speeds, and torques of the rotating electrical machines.

Such changes and modifications are to be understood as being within the scope of the present disclosure as defined by the appended claims.

What is claimed is:

1. A control apparatus for controlling a front-wheel rotating electrical machine and a rear-wheel rotating electrical machine, the front-wheel rotating electrical machine capable of driving a front wheel of a vehicle on electrical power of a battery, the rear-wheel rotating electrical machine capable of driving a rear wheel of the vehicle on the electrical power of the battery, the control apparatus comprising:
    a command torque determinator that determines a command torque for the front-wheel rotating electrical machine and a command torque for the rear-wheel rotating electrical machine based on a predetermined torque distribution ratio;
    a power distribution ratio calculator that calculates a power distribution ratio based on the torque distribution ratio, the power distribution ratio defined as a ratio in which the electrical power of the battery is distributed between the front-wheel rotating electrical machine and the rear-wheel rotating electrical machine;
    an outputtable torque calculator that calculates an outputtable torque of the front-wheel rotating electrical machine and an outputtable torque of the rear-wheel rotating electrical machine;
    a power distribution ratio corrector that corrects the power distribution ratio based on the outputtable torques calculated by the outputtable torque calculator, and
    a power distributor that distributes the electrical power of the battery between the front-wheel rotating electrical machine and the rear-wheel rotating electrical machine in the power distribution ratio corrected by the power distribution ratio corrector.

2. The control apparatus according to claim 1, wherein
the vehicle has an internal-combustion engine, a power-generation rotating electrical machine capable of generating electrical power by inputted torque and being driven on the electrical power of the battery, and a mechanical power combiner/splitter capable of transmitting outputs of the engine, the power-generation rotating electrical machine, and the front-wheel rotating electrical machine to the front wheel by combining or splitting the outputs, and
the power distribution ratio corrector corrects the power distribution ratio by limiting the command torques determined by the command torque determinator by the outputtable torques.

3. The control apparatus according to claim 1, wherein
the power distribution ratio calculator calculates the power distribution ratio so that the amount of the electrical power distributed to the front-wheel rotating electrical machine is equal to or greater than the amount of the electrical power distributed to the rear-wheel rotating electrical machine.

4. The control apparatus according to claim 1, wherein
the outputtable torque calculator calculates the outputtable torques based on a remaining power of the battery, temperatures of the front-wheel rotating electrical machine and the rear-wheel rotating electrical machine, or a combination of the temperatures, rotation speeds, and torques of the front-wheel rotating electrical machine and the rear-wheel rotating electrical machine.

5. The control apparatus according to claim 1, wherein
the vehicle has an internal-combustion engine, a power-generation rotating electrical machine capable of generating electrical power by inputted torque and being driven on the electrical power of the battery, and a mechanical power combiner/splitter capable of transmitting outputs of the engine, the power-generation rotating electrical machine, and the front-wheel rotating electrical machine to the front wheel by combining or splitting the outputs, and
the outputtable torque calculator calculates the outputtable torque of the front-wheel rotating electrical machine based on a cancel torque capable of canceling a reaction force exerted on the front wheel when the power-generation rotating electrical machine is driven to start up the engine.

6. A vehicle comprising:
the control apparatus as defined in claim 1;
the front wheel as defined in claim 1;
the rear wheel as defined in claim 1;
the battery as defined in claim 1;
the front-wheel rotating electrical machine as defined in claim 1; and
the rear-wheel rotating electrical machine as defined in claim 1.

7. The vehicle according to claim 6, further comprising:
an internal-combustion engine;
a power-generation rotating electrical machine capable of generating electrical power by inputted torque and being driven on the electrical power of the battery, and
a mechanical power combiner/splitter capable of transmitting outputs of the engine, the power-generation rotating electrical machine, and the front-wheel rotating electrical machine to the front wheel by combining or splitting the outputs.

* * * * *